United States Patent [19]

Badali

[11] Patent Number: 4,591,691

[45] Date of Patent: May 27, 1986

[54] AUXILIARY ELECTRIC HEATING SYSTEM FOR INTERNAL COMBUSTION ENGINE POWERED VEHICLES

[76] Inventor: Edward A. Badali, 970 Wintergreen Ave., Hamden, Conn. 06514

[21] Appl. No.: 665,983

[22] Filed: Oct. 29, 1984

[51] Int. Cl.[4] .......................... H05B 1/02; B60L 1/10; H01J 9/00
[52] U.S. Cl. ............................. 219/202; 123/142.5 E; 219/208; 219/279; 237/12.3 B
[58] Field of Search ............... 219/202, 208, 205, 279; 123/142.5 R, 142.5 E; 237/12.3 R, 12.3 W, 12.3 C, 12.3 B

[56] References Cited

U.S. PATENT DOCUMENTS

| | | | |
|---|---|---|---|
| 1,267,416 | 5/1918 | Jacob | 219/208 X |
| 1,683,920 | 9/1928 | Rohne | 219/208 X |
| 2,749,049 | 6/1956 | Smith | 237/12.3 B |
| 2,819,373 | 1/1958 | Allman | 219/202 |
| 2,895,678 | 7/1959 | Fairbanks et al. | 237/12.3 W |
| 3,131,864 | 5/1964 | Young | 219/202 X |
| 3,236,220 | 2/1966 | Holmes | 219/202 X |
| 3,673,379 | 6/1972 | Eversull | 219/202 |
| 3,758,031 | 9/1973 | Moran | 123/142.5 R |
| 3,795,234 | 3/1974 | Stolz | 123/142.5 R |
| 4,010,895 | 3/1977 | Kofink et al. | 237/12.3 C |
| 4,018,380 | 4/1977 | Baier | 237/12.3 C |
| 4,398,081 | 8/1983 | Moad | 219/202 |

FOREIGN PATENT DOCUMENTS

| | | | |
|---|---|---|---|
| 42539 | 12/1965 | German Democratic Rep. | 219/202 |

OTHER PUBLICATIONS

J. C. Whitney and Co. 1983 Catalog; 1917-19 Archer Avenue, Chicago, IL, 60680, pp. 7 and 8.

*Primary Examiner*—A. Bartis
*Attorney, Agent, or Firm*—Robert A. Seemann

[57] ABSTRACT

An auxiliary heating system for an internal combustion engine powered vehicle having a coolant system in which the conventional engine coolant pump circulates heated coolant from the engine to a heater radiator for transferring heat from the coolant to the vehicle passenger compartment includes a thermostatically controlled electric heating element and an electric pump located in a branch conduit receiving coolant from the heater radiator. The heating element and electric pump are selectively energizable by the vehicle operator to heat and circulate the engine coolant through a check valve and then through selectively actuated electrically controlled valves which direct it through the heater radiator, the engine or both when the engine is not running. The check valve isolates the heating element and electric pump from normal engine coolant circulation flow when the engine is running. In another embodiment an electrically controlled valve replaces the check valve for the same purpose. The auxiliary heating system may receive electric power from an AC source external to the vehicle and may adapt the AC power for operation of the electric blower conventionally associated with the vehicle's heater radiator. The engine may be precluded from being started when the electric heating element or electric pump are energized.

20 Claims, 3 Drawing Figures

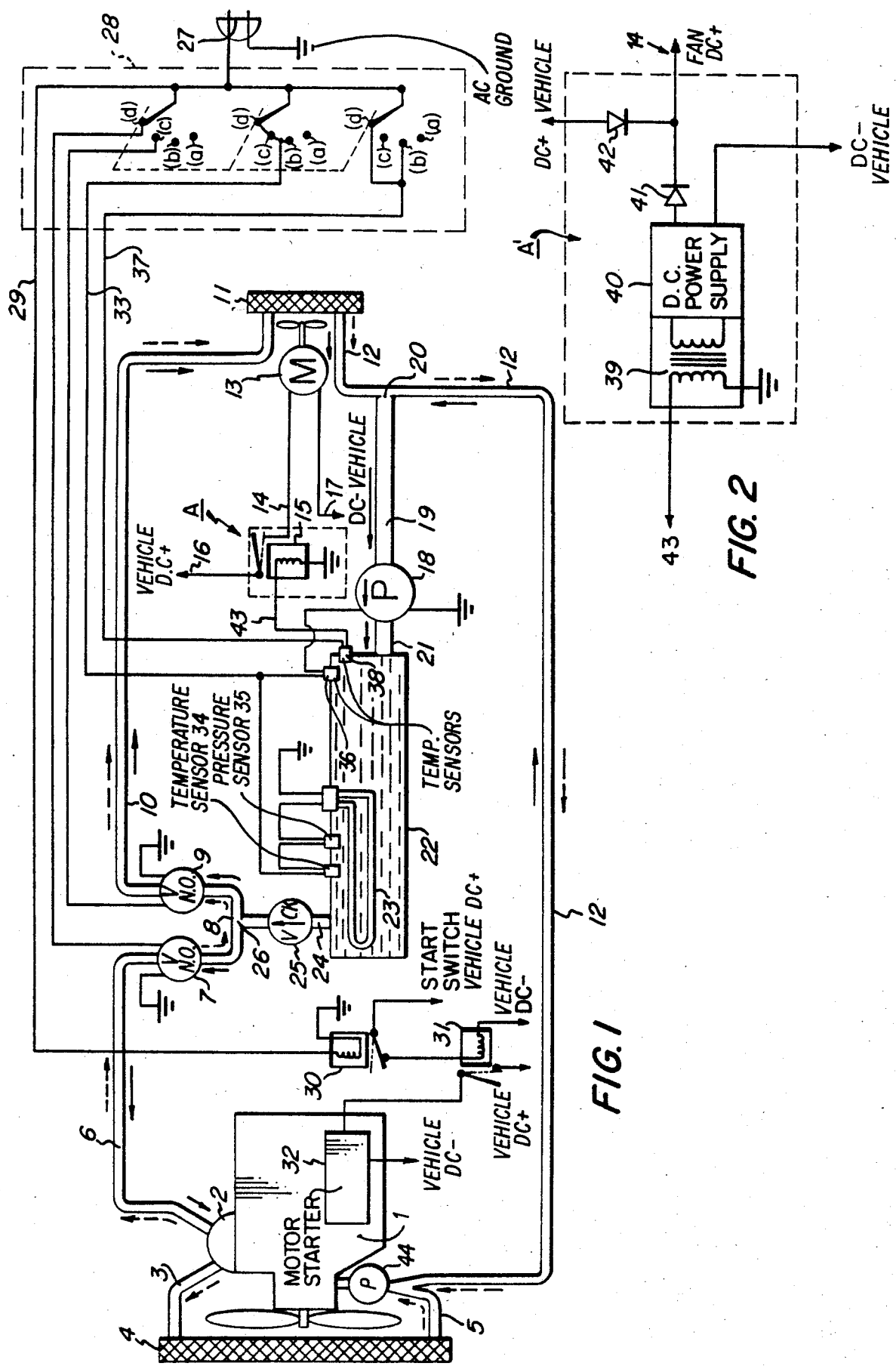

AUXILIARY ELECTRIC HEATING SYSTEM FOR INTERNAL COMBUSTION ENGINE POWERED VEHICLES

BACKGROUND OF THE INVENTION

In general this invention relates to electric heating and in particular to auxiliary heating for an internal combustion engine vehicle coolant flow system which includes a radiator element for transferring heat contained in the coolant to an enclosed area.

Cold weather start up of internal combustion engine vehicles has carried with it numerous costs and inconvenience. The passenger compartment is an uncomfortable, chilly enclosure when at ambient temperature, and the windows are frosted. The cold engine is hard to start because oil is thick and friction is high. When the engine is started, the friction takes its toll in wear on the parts. During the warm up period, fuel expenditures is higher, whether just idling or driving. These problems are inherent to gasoline and diesel engine type vehicles. Diesel engines, are tougher to start than gasoline engines and an operator of a large diesel truck often will leave the motor running for hours at rest stops and during long waits at delivery depots rather than chance difficult restart of a cold engine.

The majority of the passenger cars are left on the street over night. Those that are garaged escape obtaining frosted windows but little else, for a heated garage is a luxury few care to pay for. It is more efficient to heat relevant portions of the vehicle rather than its surrounding environment, and many ways to obtain that effect have been propounded over the last 70 or so years. The most common apparatus described for that purpose is an electric heater which heats engine coolant or its oil by conduction and convection. For example it may be installed in a hose section which is, in turn, interposed in the lower radiator hose between the engine and the radiator used for cooling the engine. Such a device is announced by J. C. Whitney & Co.; 1917–19 Archer Avenue, Chicago, IL, 60680, in the 1983 catalog (item 55-2528B, pg. 8). Similar devices are described in U.S. Pat. No. 1,683,920 issued to J. E. Rohne on Sept. 11, 1928 and in U.S. Pat. No. 1,267,416 issued to T. H. Jacob on May 28, 1918. Rhone has the heating element outside the hose section and Jacob has it located within the section.

Other conduction and convection type devices include clamp-type heaters which attach directly to an engine block (J. C. Whitney item 54-1171T, pg. 7), and freeze plug engine heaters which replace the freeze plug on the side of the block. (item 55-2363U, pg. 8). The above devices provide heat primarily to the vehicle's engine and not to the enclosed area of the vehicle comprising the passenger and cargo areas.

Installing an electric heating element in the vehicle's heater radiator and turning on its blower fan prior to use by the driver is described in U.S. Pat. No. 2,819,373 issued Jan. 7, 1958 to Roy D. Allman. His device warms the vehicle's enclosed area only, prior to entry by the driver. A heater with a pump for installation in the heater return hose is presently available (Whitney; item 54-1262P, pg. 7). This device warms the engine block and the heater radiator by passing coolant through the two vehicle elements as it heats the coolant. There is no provision, however, for automatically transferring heat to the enclosed area. In U.S. Pat. No. 4,398,081 issued Aug. 9, 1983 to Mark H. Moad, an electric heating element and pump are connected in series in the coolant line to circulate the heated coolant first through the heater radiator, providing the hottest fluid there, and then the engine. A switch circuit is provided which turns on the heater blower when the electric heating element is on.

The above and similar devices are limited to heating one area of the vehicle or tend to give priority to one when both are heated. Those which include heater, pump or other elements in series within the vehicle's coolant line may have a deleterious effect on engine cooling or heater operation when the engine is running. Not only may the enclosed elements resist smooth fluid flow but they themselves are subject to the flow during engine operation.

SUMMARY OF THE INVENTION

It is one object of the invention to provide an auxiliary heating system which may direct the heated fluid with equal priority to heat the engine and the enclosed, passenger or cargo area.

It is another object of the invention to provide an auxiliary heating system which may be easily added to an existing vehicle's coolant circulating system that includes a heater radiator, with minimal effect upon coolant flow during engine operation.

Another object is to enable one to easily select heating of either the engine or the enclosed area, or both.

Another object is to effectively isolate the system's pump and electric heating element from coolant flow during engine operation.

Another object is to prevent the engine from running when the system's electric heating element or pump are in operation.

Another object is to minimize power required to operate the system by relating pump and blower operation to heated fluid temperature.

Another object is to provide auxiliary direct current suitable for the vehicle's heater blower and electrically isolated from the vehicles blower current supply when the auxiliary heating system is operated from an atlernating current supply.

And yet another object of the invention is to provide an auxiliary heating system for an internal combustion vehicle which automatically reverts to a condition of minimum resistance to engine coolant flow when it is powered down.

Other objects and advantages of the invention will become readily apparent to persons versed in the art from the ensuing description thereof.

In accordance with the invention there is provided an auxiliary heating system for use in an internal combustion engine vehicle's coolant flow system which includes an internal combustion engine, coolant circulator pump and a radiator for transferring heat contained in the coolant to an enclosed area such as the passenger compartment, and a blower for increasing the rate of transfer. In the auxiliary heating system, an electric heating element for heating the coolant and a pump are provided. The pump receives coolant from the piping through which coolant is returned to the engine from the heater radiator, and operates to deliver electrically heated coolant through a check valve to a pair of normally open, electrically controlled valves. The output ends of the valves are interposed in the piping which provides coolant flow from the circulator pump to the heater radiator, so that the coolant flows serially through the valves on its way to the heater when the engine is running. The check valve prevents the coolant from by-passing the heater radiator by passing through the electric heater and pump. Alternatively to the check valve, a normally closed electrically controlled valve may be used. For that purpose it is wired so that it opens whenever current is switched to the electric pump. When the auxiliary heating system is operating, the electrically heated coolant is directed, by selectively operating the two valves, either through the heater radiator in the direction characteristic to normal running engine coolant flow, or through the engine in a reverse direction to normal engine coolant flow, or both of the above simultaneously.

Additionally the invention provides switching for turning on the blower and in another embodiment includes a power supply for running the blower within it's operating current parameters while the auxiliary heating system may be operating under different current parameters. Coolant temperature sensing elements are provided to prevent overheat and to save energy by shutting down the blower when coolant temperature is below a predetermined level.

BRIEF DESCRIPTION OF THE DRAWINGS

In order that the invention may be more fully comprehended it will now be described, by way of example, with reference to the accompanying drawings, in which:

FIG. 1 is a diagrammatic and schematic representation of the invention installed in an internal combustion engine vehicle's coolant flow system showing the invention and pertinent parts of the vehicle's system.

FIG. 2 is a schematic representation of the power supply for providing current of the type used by the heater radiator blower.

DETAILED DESCRIPTION OF THE PREFERRED EMBODIMENTS

Figure 3:
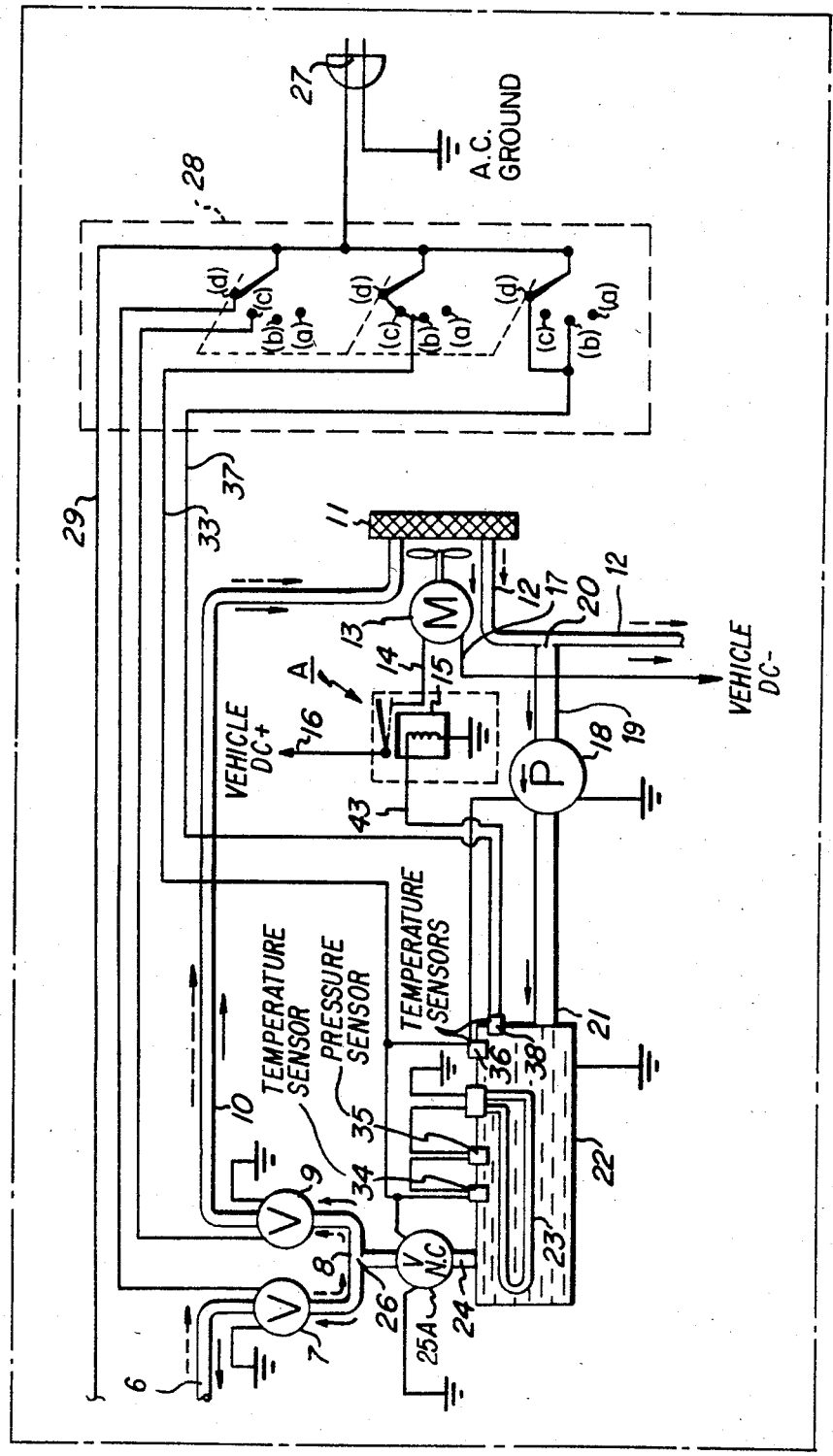
FIG. 3 is a diagrammatic and schematic representation of another embodiment of the invention.

Before explaining the invention in detail it is to be understood that the invention is not limited in its application to the details of construction and arrangement of parts illustrated in the drawings since the invention is capable of other embodiments and of being practiced or carried out in various ways. It is also to be understood that the phraseology or terminology employed is for the purpose of description and not of limitation.

Referring to the drawings, there is shown an internal combustion engine 1 which incorporates a coolant circulator pump 44 the dual-output connector 2 for which may be seen at the top of the block. When the engine is running, coolant which has absorbed its heat leaves the circulator in two paths; one path is through piping 3, engine cooler radiator 4 where heat is dissipated to the outside environment, and back to the engine by piping 5, the other path is through piping 6, normally open electrically controlled valve 7, piping 8, normally open electrically controlled valve 9, piping 10, heater radiator 11 where heat is transferred to the vehicle's enclosed area such as passenger compartment (not shown) and back to the block by piping 12 as shown by the broken arrows in FIG. 1. The engine cooler radiator 4 is shown here for clarification purpose in that it it differentiates from heater radiator 11. Heater blower 13 increases the rate of heat transfer to the vehicle's enclosed area by heater 11. It is shown connected in FIG. 1 by DC positive line 14 to normally open electrical relay 15. When relay 15 is closed, it permits current to flow to the blower from the vehicle's fan-controlling direct current supply line 16. The blower DC circuit is returned to that supply's ground by line 17.

When the auxiliary heating system is operating, pump 18 receives coolant from piping 12, by way of piping 19 through junction 20 and pumps it through piping 21 into conduit 22 which contains electric heating element 23. The coolant continues to flow through connection 24, through check valve 25 and ito junction 26 where its flow divides through normally open valves 7 and 9 as shown by the solid arrows in FIG. 1. The motor's coolant circulator pump is inoperative, for reasons which will be explained later. In a preferred embodiment, the auxiliary heating system is operated on wall current of 110 volts AC, although the vehicle's accessory and engine circuit is 12 volts DC. Electrical plug 27 provides the AC current to three-pole-four-position switch 28. The grounded side of the plug line is made auxiliary heating system ground, 'floating' or independent from the vehicle's DC circuit. When the ganged poles of switch 28 are in position (a), it can be seen that valve 7, 9 and pump 18 are not supplied with energizing current. This leaves the valves open, the pump off and the vehicle's coolant system in condition for normal engine-circulator driven coolant circulation. Check valve 25 effectively isolates the auxiliary heating system coolant heating and pump portions from the coolant arriving at junction 26 under relatively higher circulator pressure.

Normally closed relay 30 admits vehicle DC current to operate starting relay 31 for motor starter 32. While it is activated, relay 30 remains open, preventing engine start by disabling the starter relay. Electrical line 29 automatically brings energizing current to normally closed relay 30 as long as the auxiliary heating system is connected to a live external AC circuit. It is to be understood that relay 30 may be located so as to control an ignition coil to prevent a gasoline engine from running while the relay is activated. It is also to be understood that the engine may be controlled for the same purpose by including an electrically operated normally open fuel control valve instead of relay 30.

When switch 28 is in position (b), valve 7 and 9 are not energized and are open. Heating element 23 receives current from line 33 after it passes through temperature sensing element 34 and pressure sensing element 35. Temperature sensing element 34 passes current until a predetermined temperature is reached. Pressure sensing element 35 performs the safety function of opening the circuit if a predetermined pressure is reached. Pump 18 is energized by receiving current via line 33 and temperature sensing element 36. Temperature sensing element 36 conducts current once a predetermined minimum operating temperature is reached for economical and efficient pump operation. In the mean time the engine circulator is not operating and the coolant flow urged by pump 18 divides through valves 7 and 9 as explained earlier, taking divergent paths. Through valve 9 it flows through piping 10, through heater radiator 11, piping 12, junction 20 and back to the pump through piping 19. Through valve 7 it flows in a direction opposite to that of engine operating flow, traveling by way of piping 6, and output connector 2, through the engine and back to the pump by piping 12 and 19. Both the engine and heater radiator coolant flow paths receive freshly heated coolant.

When switch 28 is in position (c), valve 7 is not energized while valve 9, the heating element and pump are energized. Valve 7 is therefore open, permitting heated coolant flow through the engine only, warming the engine. Valve 9 is closed.

When switch 28 is in position (d), valve 9 is not energized, while valve 7, the heating element and pump are energized. Valve 9 is therefore open, permitting heated coolant flow through the heater radiator only, for heating the vehicle's enclosed area. Valve 7 is closed.

Heater radiator blower 13 is operative when switch 28 is in (b) and (d) positions. Line 37 provides current to relay 15 by way of temperature sensing element 38 and line 43. Temperature sensor 38 conducts current once a predetermined minimum operating temperature is reached for economical and efficient closed area heating. In the embodiment shown in FIG. 1, the blower receives operating current from the vehicle's main or auxiliary battery (not shown).

Referring to FIG. 2, the electrically isolated AC input, DC output power supply circuit "A'" may replace relay 15 circuit "A", if it were expected that blower 13 would be run for an extended time resulting in excessive drain on the vehicle's battery DC current supply. Transformer 39 isolates DC power supply 40 from the AC supply circuit. Diode 41 isolates the DC supply's output circuit from the vehicle's DC current and diode 42 protects the vehicle's DC source from power supply current flow. The two sources are thereby made independent from each other. Although they share the same DC current return line from the blower, each may provide current at different DC voltages to the blower without damage to the other.

In another embodiment of the invention, referring now to FIG. 3, pump 18 delivers freshly heated coolant to heater 11 and motor 1 by way of piping 19, junction 20 and piping 12. Flow control for heating one or the other or both is provided by valves 7 and 9 as described earlier, as coolant must flow back to conduit 22 by way of the valves. The valve 25 of FIG. 1 is changed in this embodiment to a normally closed electrically controlled valve 25A, electrically connected to line 33 so that it opens when current is switched to the pump. Closed, it effectively isolates the auxiliary heating system's coolant heating and pump portions from the engine-circulator-driven coolant arriving at junction 26. FIG. 3 illustrates this embodiment wherein valve 25A is the normally closed electrically controlled valve. It is electrically connected to AC line 33 so that it is energized whenever AC current is switched to electric pump 18. It's electrical return is through AC ground.

From the foregoing description of the invention it will be seen that an auxiliary heating system for an internal combustion engine vehicle is provided which will direct the fluid it heats with equal priority to heat the engine and the enclosed, passenger or cargo area; that is easy to add to an existing vehicle's coolant flow system with minimal effect upon coolant flow during engine operation; provides selection of heating engine, enclosed area or both; is electrically independent from the vehicles electrical system; operates with maximum efficiency and automatically enables the vehicles coolant system for normal engine operation when it is disconnected from the external power source.

Although the invention has been described in specific terms it will be understood that various changes may be made in size, shape and materials and in the arrangement of the parts without departing from the spirit and scope of the invention as claimed.

Having thus set forth the nature of the invention, what is claimed herein is:

1. In an internal combustion engine vehicle coolant flow system which includes an internal combustion engine, coolant circulator pump for pumping coolant heated by the engine from the engine, a heating radiator for transferring heat contained in the coolant to an enclosed area of the vehicle, electric blower means for increasing the rate of heat transfer by the radiator to the enclosed area and a first piping by which the coolant flow is established from the coolant circulator pump to the radiator and a second piping by which the coolant flow is established from the radiator to the engine, the improvement comprising an auxiliary heating system including:

a electric pump, connected at its input side to the second piping for receiving coolant fluid therefrom, a check valve having an input and an output end, a conduit for connecting said check valve to the output end of said electric pump, said check valve being oriented so that its input end receives fluid from the electric pump for flow therethrough to its output end and that it will prevent fluid flow back through it to the electric pump, a first normally open electrically controlled valve single path connected at one end to the check valve output and at the other end to the first piping, a second normally open electrically controlled valve single path connected at one end to the check valve output and at the other end to the first piping at a point spaced from the connection of said first valve with the first piping, there being no direct through connection in the first piping between where the two single path valves join the piping so that fluid flowing from the coolant circulator pump to the radiator as recited earlier must pass serially through the valve in flowing through the first piping, said first and second valves normally being open to fluid flow, and being closed to interrupt fluid flow when electrically excited, a electric heating element, mounted sealingly in the conduit and adapted for receiving electrical current from without the conduit, for providing heat to the coolant flowing therethrough, a temperature sensing element connected for interrupting electrical current flow through the electric heating element when a predetermined coolant temperature in the auxiliary heating system is reached, mounted for sensing coolant temperature in said auxiliary heating system, means for receiving a first electrical current and, means for switching the first electrical current on or off to the electric heating element, means for selectively switching the first electrical current through the normally open valves and through the electric pump in any order of options, among options comprising;

(a) no current through the electric pump and no current through either valve so that they remain open for permitting unimpeded coolant flow through the internal combustion engine coolant flow system by the coolant circulator pump, (b) current through the electric pump yet not through either valve so that coolant driven through the check valve by the electric pump takes two paths, and passes through the first valve then the engine by way of the first piping and returns to the electric pump by way of the second piping, while it sumultaneously passes through the second valve, then the radiator by way of the first piping after which it returns to the electric pump by way of the second piping, (c) current through the electric pump and the second valve to exclusion of the first valve so that coolant driven through the check valve by the electric pump passes through the first valve then the engine by way of the first piping and returns to the electric pump by way of the second piping and is restricted from flow to and through the radiator by the closed, second valve, and (d) current through the electric pump and the first valve to exclusion of the second valve so that coolant driven through the check valve by the electric pump passes through the second valve, then the radiator by way of the first piping after which it returns to the electric pump by way of the second piping, and is retricted from flow to the engine by the closed first valve.

2. The auxiliary heating system as recited in claim 1, wherein said means for switching electrical current on or off to the electric heating element is connected for switching current on simultaneously with current being switched on to the electric pump.

3. The auxiliary heating system as recited in claim 2, further comprising means for switching the electrical current on or off to said electric blower means.

4. The auxiliary heating system as recited in claim 3, further comprising a temperature sensing element connected for interrupting current flow through the blower when sensing coolant temperature in said auxiliary heating system below a predetermined value and mounted for sensing coolant temperature in said auxiliary heating system.

5. The auxiliary heating system as recited in claim 4, further comprising a temperature sensing element connected for interrupting current flow through the pump when sensing coolant temperature in said auxiliary heating system below a predetermined value and mounted for sensing coolant temperature in said auxiliary heating system.

6. The auxiliary heating system as recited in claim 1, 2, 3, 4, or 5 further comprising, means for preventing successful start of the internal combustion engine, said means being rendered operative in response to current being switched on to at least one of the electric pump or the coolant heating element.

7. The auxiliary heating system as recited in claim 1, 2, 3, 4, or 5 further comprising, means for preventing successful start of the internal combustion engine, said means being operative in response to the auxiliary heating system receiving electrical current.

8. The auxiliary heating system as recited in claim 7 wherein;
the electric blower means is of the DC operating type,
said means for receiving the first electrical current is adapted for receiving AC, and further comprising;
means for receiving a second electrical current, said second electrical current receiving means is adapted for receiving DC and,
means for relaying the DC on through the electric blower means, said relaying means being rendered operative upon the AC being switched on to the blower means.

9. The auxiliary heating system as recited in claim 7 wherein;
the electric blower means is of the direct current operating type, and the vehicle includes a DC electric blower current supply means,
said means for receiving the first electrical current is adapted for receiving AC and, further comprising;
an AC transformer-isolated input, DC output power supply, connected for receiving and converting AC into an independent DC for delivery to the electric blower and,
diode means for assuring mutually exclusive delivery of direct current to the electric blower means from the direct current output power supply and the vehicle's internal electric blower DC supply.

10. The auxiliary heating system as recited in claim 3, 4 or 5 wherein;
the electric blower means is of the DC operating type,
said means for receiving the first electrical current is adapted for receiving AC, and further comprising;
means for receiving a second electrical current, said second electrical current receiving means is adapted for receiving DC and,
means for relaying the DC on through the electric blower means, said relaying means being rendered operative upon the AC being switched on to the pump.

11. The auxiliary heating system as recited in claim 3, 4 or 5 wherein;
the electric blower means is of the direct current operating type, and the vehicle includes a DC electric blower current supply means,
said means for receiving the first electrical current is adapted for receiving AC and, further comprising;
an AC transformer-isolated input, DC output power supply, connected for receiving and converting AC to an independent DC for delivery to the electric blower and,
diode means for assuring mutually exclusive delivery of direct current to the electric blower means from the direct current output power supply and the vehicle's internal electric blower DC supply.

12. The auxiliary heating system as recited in claim 1, 2, 3, 4, or 5 further comprising a pressure sensing element connected for interrupting current flow through the electric heating element when sensing coolant pressure above a predetermined value and mounted for sensing coolant pressure in said auxiliary heating system; and means for preventing successful start of the internal combustion engine, said means being operative in response to said auxiliary heating system receiving electrical current.

13. In an internal combustion engine vehicle coolant flow system which includes an internal combustion engine, coolant circulator pump for pumping coolant heated by the engine from the engine, a heating radiator for transferring heat contained in the coolant to an enclosed area of the vehicle, electric blower means for increasing the rate of heat transfer by the radiator to the enclosed area and a first piping by which the coolant flow is established from the coolant circulator pump to the radiator and a second piping by which the coolant flow is established from the radiator to the engine, the improvement comprising an auxiliary heating system including:

a electric pump having a first end and a second end, connected at the first end to the second piping, a normally closed electrically controlled valve having a first end and a second end which opens to permit fluid flow when electrically excited, electrically connected to the pump so that it opens when the pump is electrically excited, a conduit for connecting the first end of said normally closed valve to the second end of said electric pump, a first normally open electrically controlled single path valve connected at one end to the second end of the normally closed valve and at its other end to the first piping, a second normally open electrically controlled single path valve connected at one end of the second end of the normally closed electrically controlled valve valve and at the other end to the first piping at a point spaced from the connection of said first valve with the first piping, there being no direct through connection in the first piping between where the two single path valves join the piping so that fluid flowing from the coolant circulator pump to the radiator as recited earlier must pass serially through the valves in flowing through the first piping, said first and second valves, being normally open to fluid flow, and being closed to interrupt fluid flow when electrically excited, electric heating element, mounted sealingly in the conduit and adapted for receiving electrical current from without the conduit, for providing heat to the coolant flowing through the conduit, a temperature sensing element connected for interrupting electrical current flow to the electric heating element when a predetermined coolant temperature in the auxiliary heating system is reached and mounted for sensing coolant temperature in the auxiliary heating system, means for receiving a first electrical current and, means for switching the first electrical current on or off to the electric heating element means for selectively switching the first electrical current through the normally open valves and through the electric pump in any order of options, among options comprising;

(a) no current through the electric pump and no current through either normally open valve so that they remain open for permitting unimpeded coolant flow through the internal combustion engine coolant flow system by the coolant circulator pump, (b) current through the electric pump yet not through either normally open valve so that coolant driven by the electric pump simultaneously passes through the engine and radiator in returning to the pump, (c) current through the electric pump and the second normally open valve to exclusion of the first normally open valve so that coolant driven by the electric pump passes through the engine in returning to the pump and is restricted from flow through the radiator by the closed second normally open valve, (d) current through the electric pump and the first normally open valve to exclusion of the second normally open valve so that coolant driven by the electric pump passes through the radiator in returning to the pump and is restricted from flow to the engine by the closed first normally open valve.

14. The auxiliary heating system as recited in claim 13, wherein said means for switching electrical current on or off to the electric heating element is connected for switching current on simultaneously with current being switched on to the electric pump.

15. The auxiliary heating system as recited in claim 14, further comprising means for switching electrical current on or off to said electric blower means.

16. The auxiliary heating system as recited in claim 15, further comprising a temperature sensing element connected for interrupting current flow through the blower when sensing coolant temperature in said auxiliary heating system below a predetermined value and mounted for sensing coolant temperature in said auxiliary heating system.

17. The auxiliary heating system as recited in claim 16, further comprising a temperature sensing element connected for interrupting current flow through the pump when sensing coolant temperature in said auxiliary heating system below a predetermined value and mounted for sensing coolant temperature in said auxiliary heating system.

18. The auxiliary heating system as recited in claim 13, 14, 15, 16 or 17 further comprising, means for preventing successful start of the internal combustion engine, said means being rendered operative in response to current being switched on to at least one of the electric pump or the coolant heating element.

19. The auxiliary heating system as recited in claim 15, 16 or 17 wherein;

the electric blower means is of the DC operating type, said means for receiving the first electrical current is adapted for receiving AC, and further comprising;

means for receiving a second electrical current, said second electrical current receiving means being adapted for receiving DC and, means for relaying the DC on through the electric blower means, said relaying means being rendered operative upon the AC being switched on to the blower means.

20. The auxiliary heating system as recited in claim 15, 16, or 17 wherein;

the electric blower means is of the direct current operating type, and the vehicle includes a DC electric blower current supply means, said means for receiving the first electrical current is adapted for receiving AC and, further comprising;

an AC transformer-isolated input, DC output power supply, connected for receiving and converting AC into an independent DC for delivery to the electric blower and, diode means for assuring mutually exclusive delivery of direct current to the electric blower means from the direct current output power supply and the vehicle's internal electric blower DC supply.

* * * * *